(12) United States Patent
Park

(10) Patent No.: US 10,703,177 B2
(45) Date of Patent: Jul. 7, 2020

(54) AIR VENT FOR VEHICLE

(71) Applicant: HYUNDAI MOBIS CO., LTD., Seoul (KR)

(72) Inventor: Ie Seob Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 62 days.

(21) Appl. No.: 16/021,765

(22) Filed: Jun. 28, 2018

(65) Prior Publication Data

US 2019/0126728 A1 May 2, 2019

(30) Foreign Application Priority Data

Nov. 1, 2017 (KR) .......................... 10-2017-0144956

(51) Int. Cl.
*B60H 1/34* (2006.01)
*B60H 1/24* (2006.01)
*F24F 13/08* (2006.01)
*F24F 13/14* (2006.01)

(52) U.S. Cl.
CPC ............. *B60H 1/3421* (2013.01); *B60H 1/24* (2013.01); *B60H 1/34* (2013.01); *F24F 13/08* (2013.01); *F24F 13/14* (2013.01); *B60H 2001/3471* (2013.01); *B60H 2001/3478* (2013.01)

(58) Field of Classification Search
CPC .......... B60H 2001/3417; B60H 1/3421; B60H 1/3414; B60H 1/3428
USPC ......................................... 454/152–155, 314
See application file for complete search history.

(56) References Cited

U.S. PATENT DOCUMENTS 10,414,246 B2 * 9/2019 Shibata ................ B60H 1/3421

FOREIGN PATENT DOCUMENTS

KR 10-2015-0070561 A 6/2015

* cited by examiner

*Primary Examiner* — Vivek K Shirsat
(74) *Attorney, Agent, or Firm* — Knobbe Martens Olson & Bear LLP

(57) ABSTRACT

An air vent for a vehicle may include: a damper configured to open/close a housing connected to a blower duct; a damper knob installed in the housing so as to be connected to the damper, and exposed to the front of a wing member for adjusting a blowing direction; and an opening/closing interlocking part installed in the housing so as to connect the damper and the damper knob.

6 Claims, 10 Drawing Sheets

AIR VENT FOR VEHICLE

CROSS-REFERENCES TO RELATED APPLICATIONS

The present application claims priority to Korean application number 10-2017-0144956, filed on Nov. 1, 2017, which is incorporated by reference in its entirety.

BACKGROUND OF THE INVENTION

The present invention relates to an air vent for a vehicle, and more particularly, to an air vent for a vehicle, which can improve space utilization efficiency because a damper knob for opening/closing a damper is installed on a wing knob.

In general, a vehicle has an air vent for blowing cooled/heated air. The air vent includes a housing connected to a blower duct, a damper for opening/closing the housing, and a blowing direction adjusting member for adjusting a blowing direction.

The damper includes a damper knob for an operation of a user, an opening/closing door which is operated by the damper knob and opens/closes the housing, and a link for connecting the damper knob and the opening/closing door. The housing is opened/closed while the door is rotated by an operation of the damper knob.

The related art of the present invention is disclosed in Korean Patent Publication No. 2015-0070561 published on Jun. 25, 2015 and entitled "Air vent structure for vehicle".

The technology is a related art for promoting understandings of the present invention, and does not indicate a related art which is widely known in the art to which the present invention pertains.

In the related art, since a wing knob for adjusting the direction of air and the damper knob are installed separately from each other, the size of the air vent is inevitably increased, which makes it difficult to efficiently utilize the space. Furthermore, there is a limitation in designing the air vent.

Therefore, there is a demand for a structure capable of solving the problems.

SUMMARY OF THE INVENTION

Embodiments of the present invention are directed to an air vent for a vehicle, which can improve space utilization efficiency because a damper knob for opening/closing a damper is installed on a wing knob.

In one embodiment, an air vent for a vehicle may include: a damper configured to open/close a housing connected to a blower duct; a damper knob installed in the housing so as to be connected to the damper, and exposed to the front of a wing member for adjusting a blowing direction; and an opening/closing interlocking part installed in the housing so as to connect the damper and the damper knob.

The damper knob may be coupled to a wing knob for adjusting the blowing direction in the wing member, and connected to the opening/closing interlocking part so as to be moved with the wing knob.

The damper knob may be rotatably coupled to the wing knob, in order to operate the opening/closing interlocking part.

The opening/closing interlocking part may include: a knob shaft coupled to the damper knob, rotated by the damper knob, and moved according to an operation of the wing knob installed in the housing; a damper interlocking member interlocked through the knob shaft so as to open/close the damper; and a connection member connecting the knob shaft and the damper interlocking member such that a rotational force of the knob shaft is transferred to the damper interlocking member.

The damper interlocking part may include: a driven gear installed in the damper; and a damper rotating member having a driving gear engaged with the driven gear, and connected to the connection member so as to rotate the driven gear while being selectively rotated according to an operation of the knob shaft.

The damper rotating member may further include a guide part to which the connection member is movably coupled.

The guide part may include: a seating groove in which the connection member is seated; and a guide groove guiding the connection member to linearly move.

The connection member seated in the guide part may be linearly moved in the seating groove according to a position movement of the knob shaft, and the damper rotating member may be rotated with the connection member, as the connection member is locked to the guide groove when the knob shaft is rotated.

The connection member may be hinge-connected to the knob shaft, and rotated and linearly moved in the damper interlocking member according to a positional change of the knob shaft.

The connection member may include: a shaft positioner movably coupled to the damper interlocking member; a pivot link rotatably coupled to the shaft positioner; and a connection link connecting the pivot link and the knob shaft.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
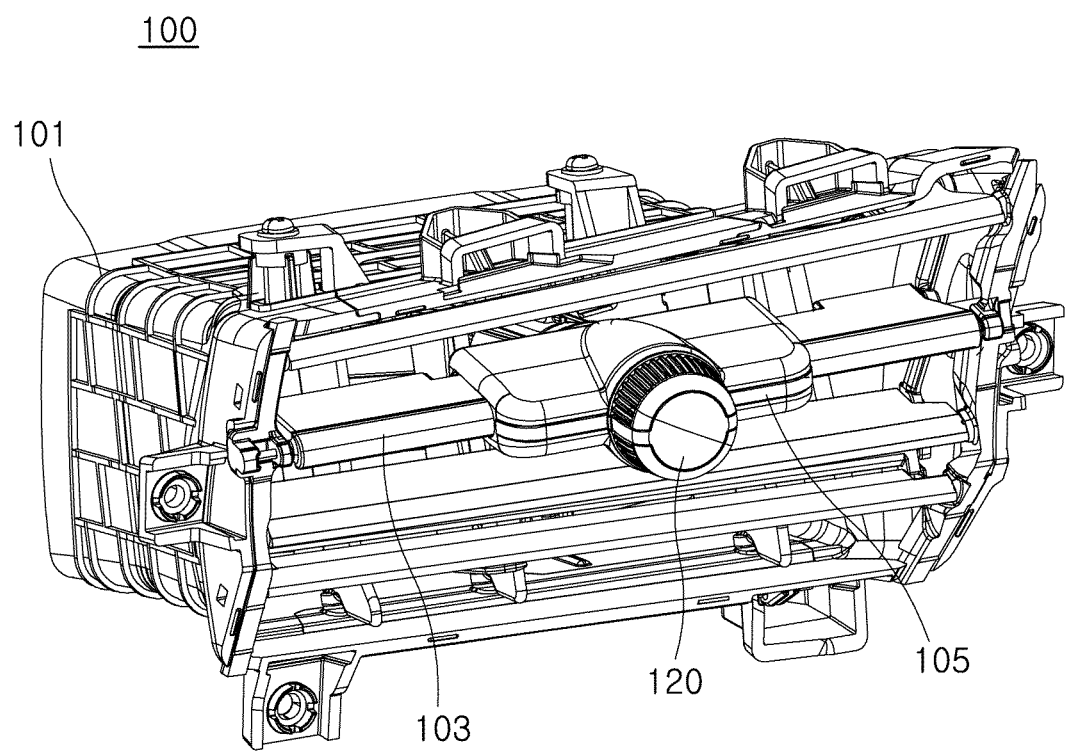
FIG. 1 is a perspective view illustrating that an air vent for a vehicle in accordance with an embodiment of the present invention is installed.
Figure 2:
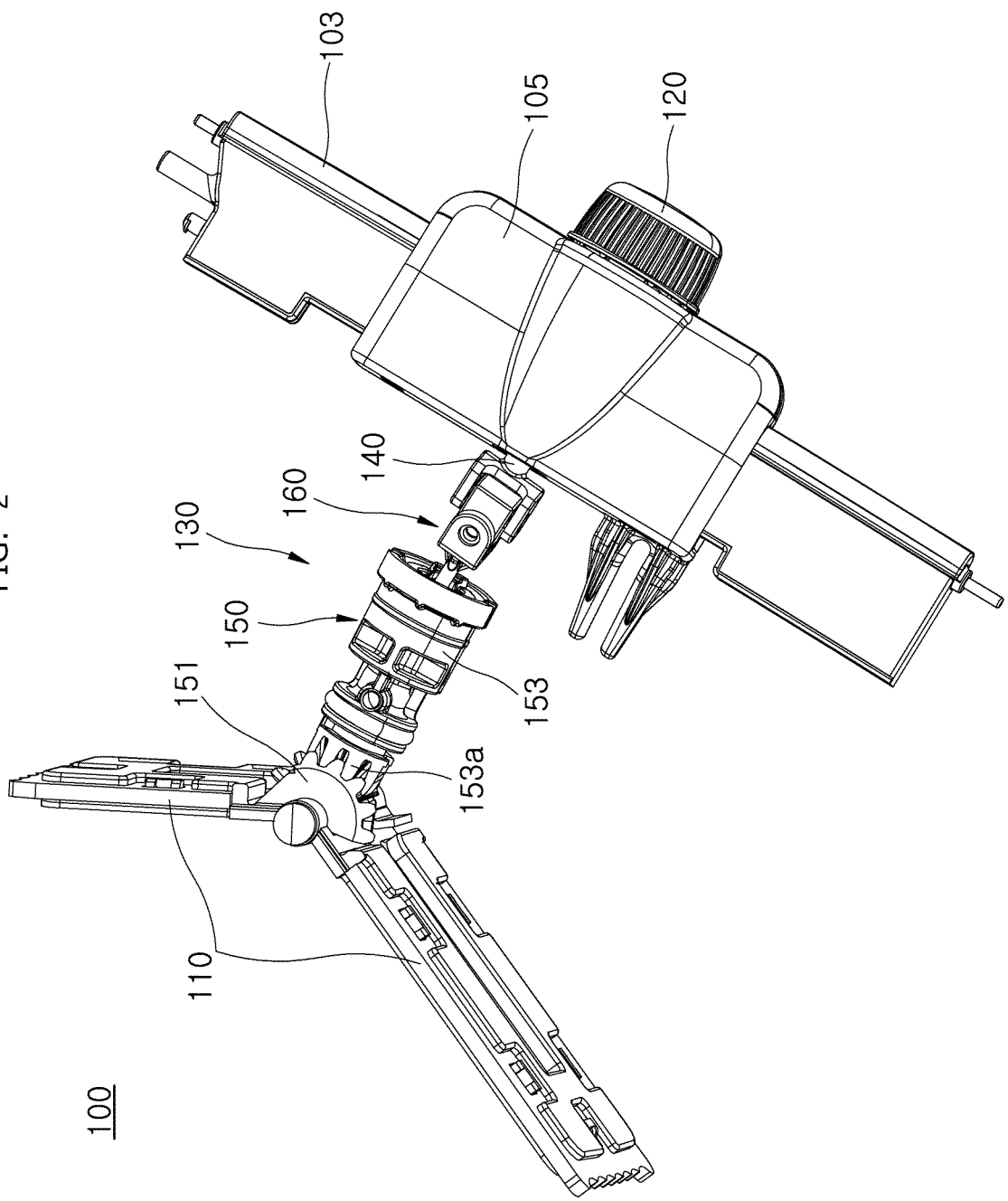
FIG. 2 is a perspective view illustrating the air vent for a vehicle in accordance with the embodiment of the present invention.
Figure 3:
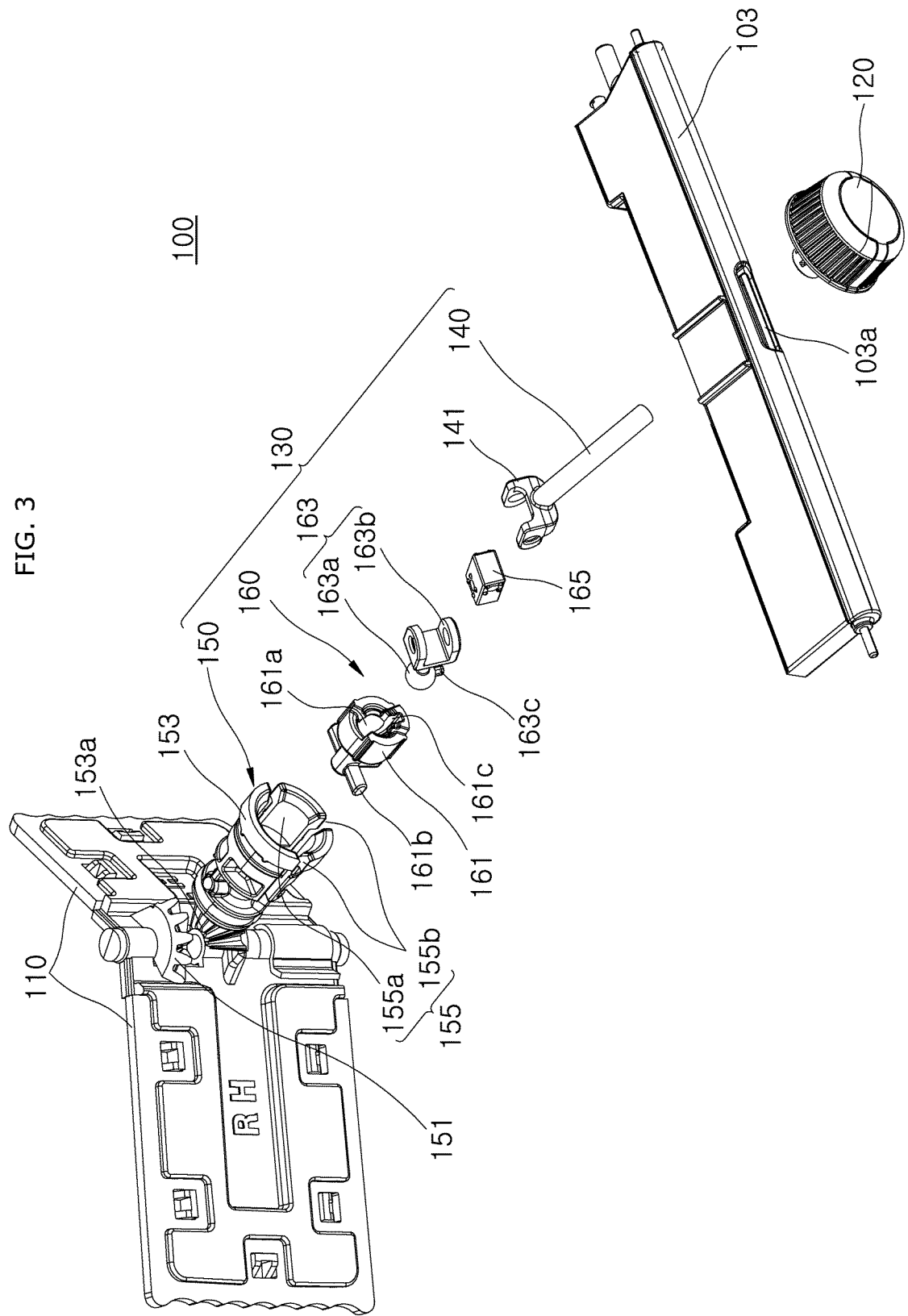
FIG. 3 is an exploded perspective view illustrating the air vent for a vehicle in accordance with the embodiment of the present invention.

FIG. 1 is a perspective view illustrating that an air vent for a vehicle in accordance with an embodiment of the present invention is installed, FIG. 2 is a perspective view illustrating the air vent for a vehicle in accordance with the embodiment of the present invention, and FIG. 3 is an exploded perspective view illustrating the air vent for a vehicle in accordance with the embodiment of the present invention.

Figure 4:
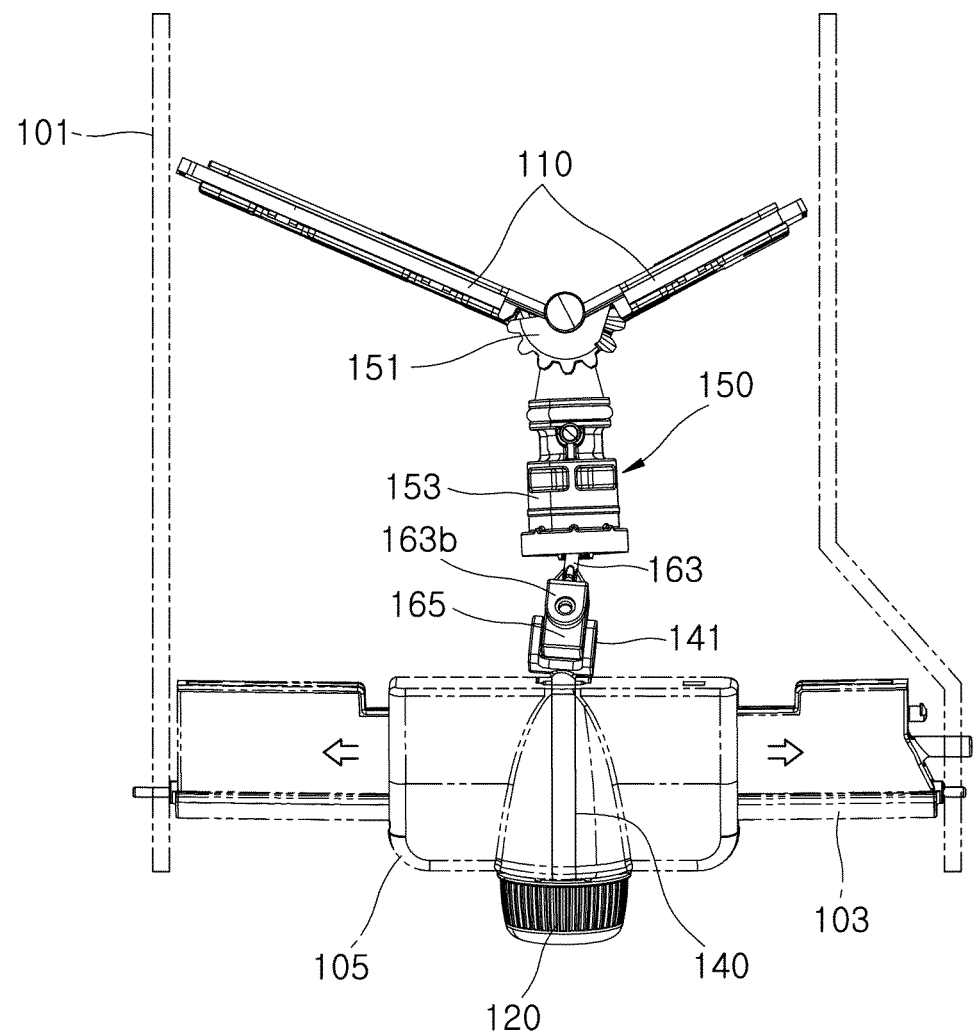
FIG. 4 is a plan view of FIG. 2.
Figure 5:
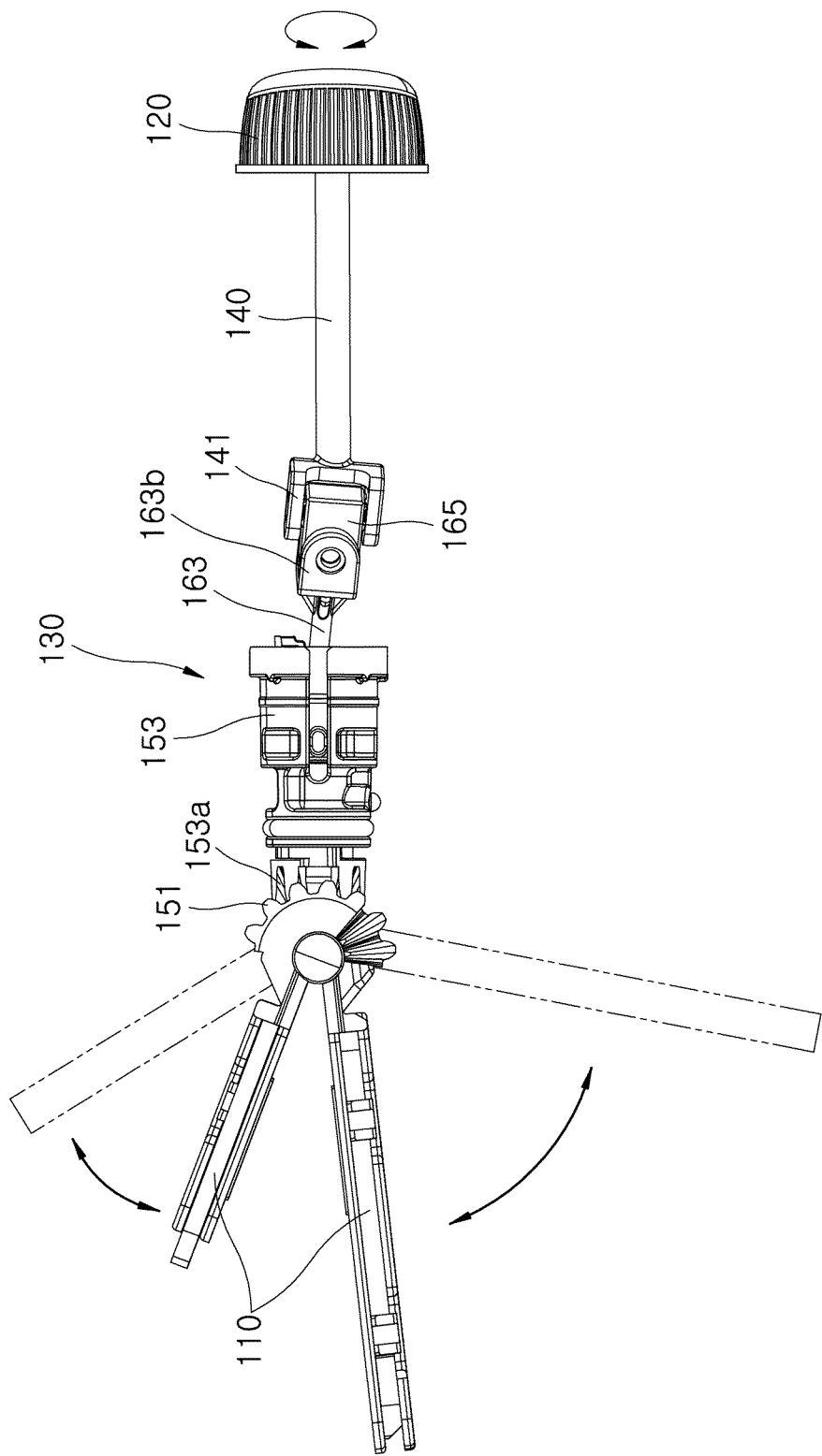
FIG. 5 is a plan view illustrating that the air vent for a vehicle in accordance with the embodiment of the present invention is opened/closed.
Figure 6:
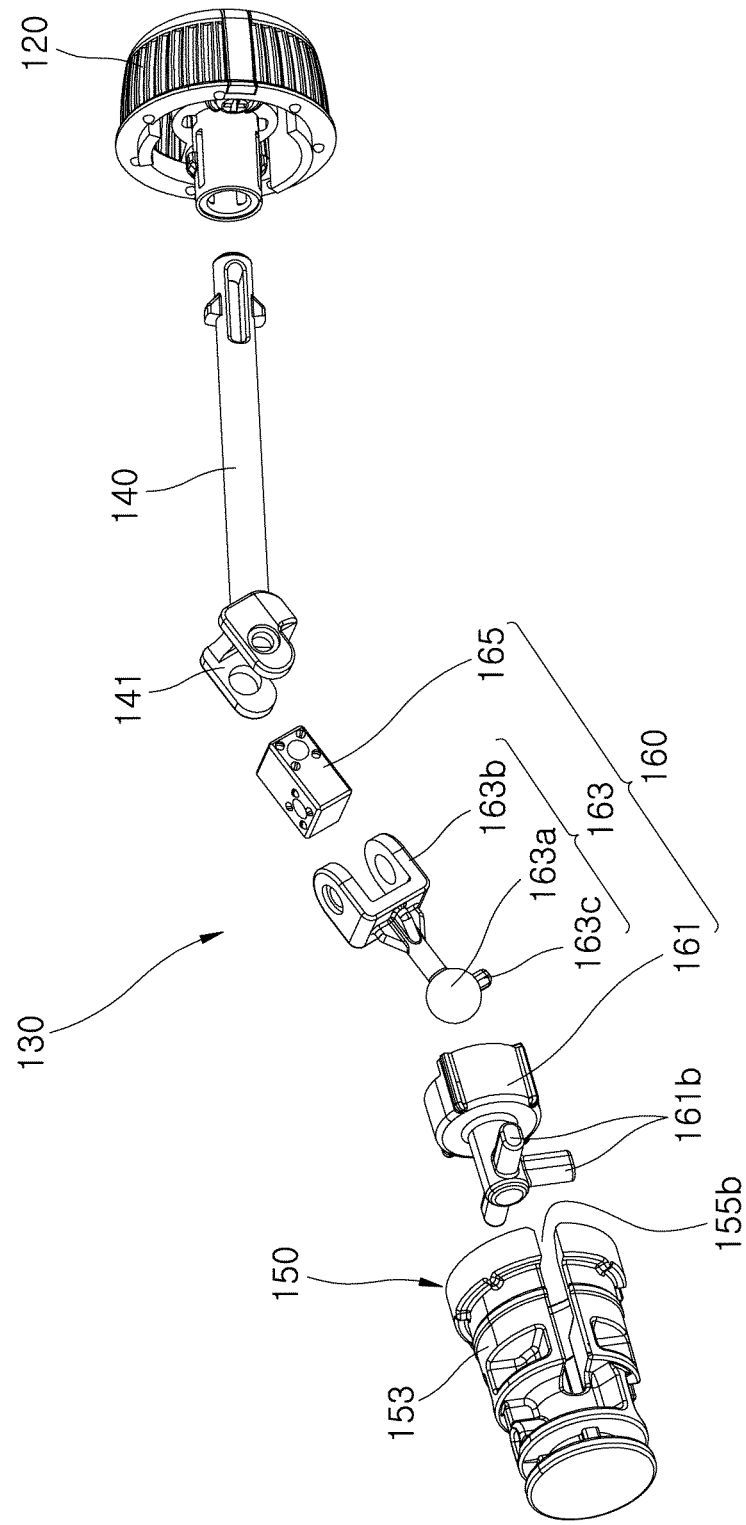
FIG. 6 is a perspective view illustrating an opening/closing interlocking part in accordance with the embodiment of the present invention.

FIG. 4 is a plan view of FIG. 2, FIG. 5 is a plan view illustrating that the air vent for a vehicle in accordance with the embodiment of the present invention is opened/closed, and FIG. 6 is a perspective view illustrating an opening/closing interlocking part in accordance with the embodiment of the present invention.

Figure 7:
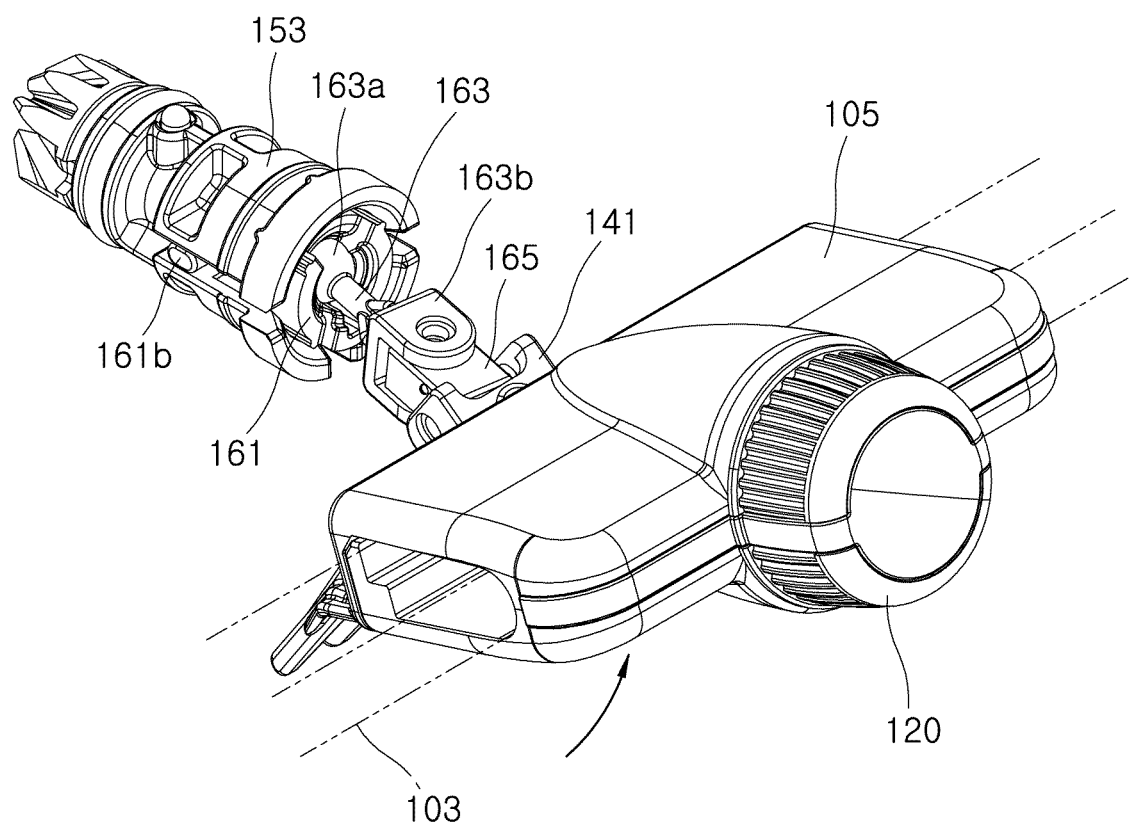
FIG. 7 illustrates the states of the opening/closing interlocking part and a damper knob with a wing member facing upward.
Figure 8:
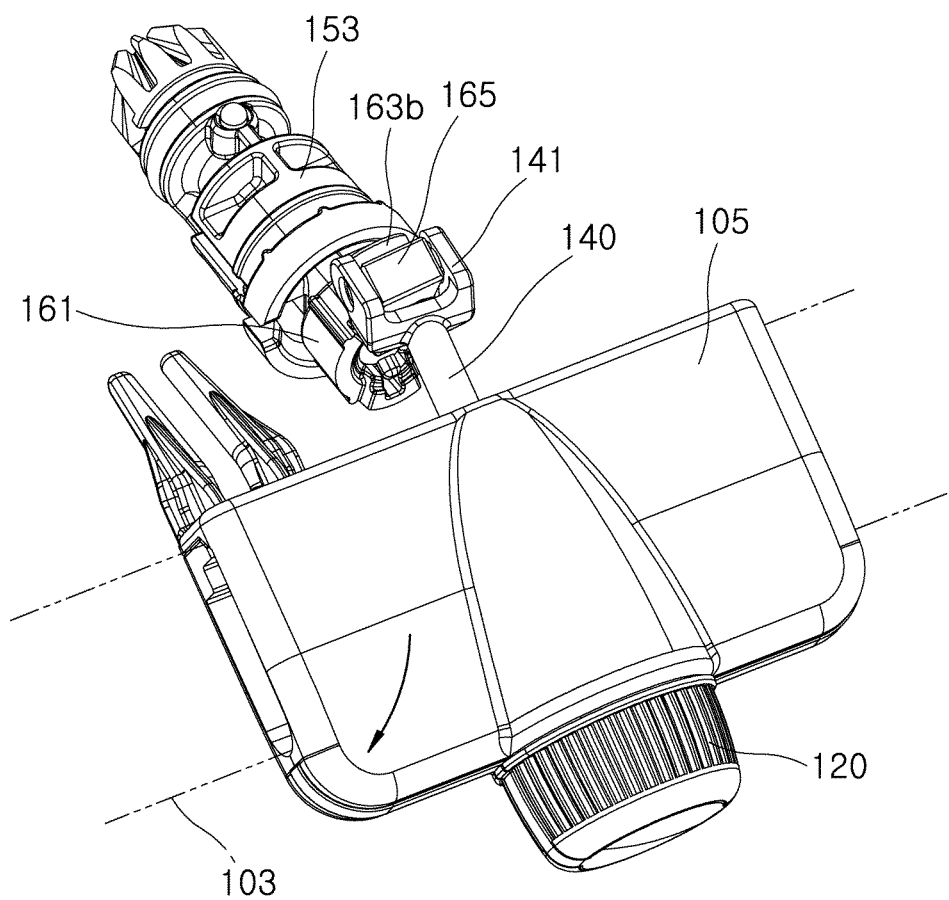
FIG. 8 illustrates the states of the opening/closing interlocking part and the damper knob with the wing member facing downward.
Figure 9:
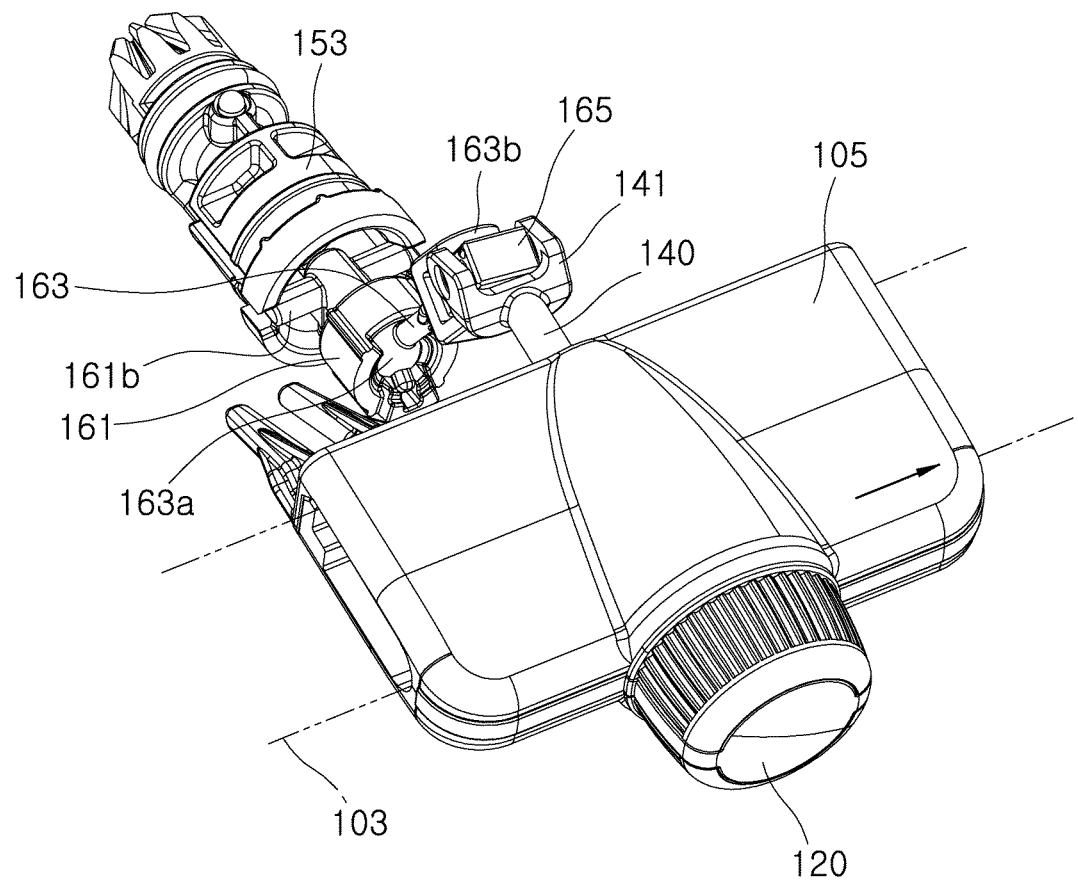
FIG. 9 illustrates the states of the opening/closing interlocking part and the damper knob with the wing member moved to the right.
Figure 10:
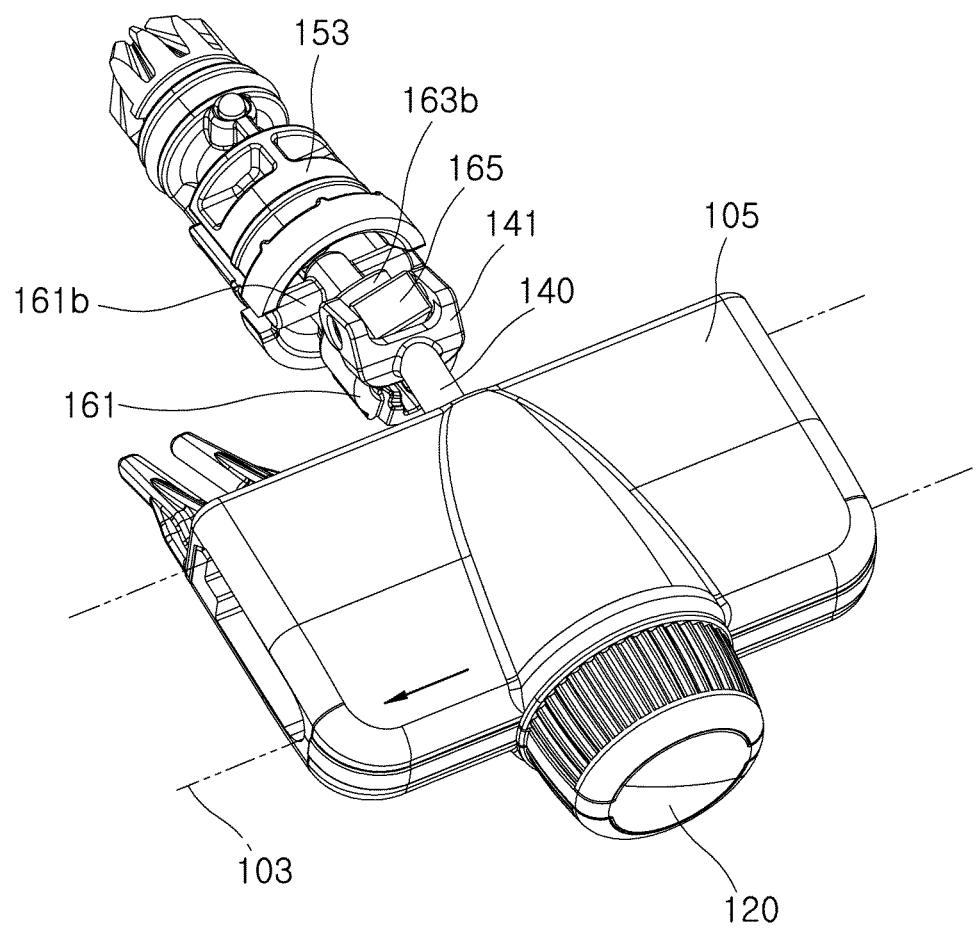
FIG. 10 illustrates the states of the opening/closing interlocking part and the damper knob with the wing member moved to the left.

FIG. 7 illustrates the states of the opening/closing interlocking part and a damper knob with a wing member facing upward, FIG. 8 illustrates the states of the opening/closing interlocking part and the damper knob with the wing member facing downward, FIG. 9 illustrates the states of the opening/closing interlocking part and the damper knob with the wing member moved to the right, and FIG. 10 illustrates the states of the opening/closing interlocking part and the damper knob with the wing member moved to the left.

Referring to FIGS. 1 to 6, the air vent 100 for a vehicle in accordance with the embodiment of the present invention may include a damper 110, a damper knob 120 and an opening/closing interlocking part 130.

The damper 110 may be rotatably coupled to the inside of a housing 101 so as to open/close the housing 101 connected to a blower duct (not illustrated) of the vehicle. The damper 110 may be connected to the damper knob 120 through the opening/closing interlocking part 130, and open/close the housing 101 while being rotated in the housing 101 through an operation of the damper knob 120.

At this time, the housing 101 may have a wing member 103 which is rotatably installed to adjust a blowing direction to the top/bottom or left/right direction, and a wing knob 105 for adjusting the blowing direction may be installed on the wing member 103. The wing member 103 may have an installation hole 103a through which the opening/closing interlocking part 130 for connecting the damper knob 120 and the damper 110 is installed. The damper knob 120 may be rotatably coupled to the wing knob 105.

The damper knob 120 may be rotatably coupled to the wing knob 105 so as to be exposed to the front of the wing knob 105, and the direction of the damper knob 120 may be changed according to a change in direction of the wing knob 105. For example, as the direction of the wing knob 105 is changed to the top/bottom or left/right direction, the position of the damper knob 120 may be moved upward/downward or left/right.

As the damper knob 120 is rotated by a user, the damper knob 120 may interlock the opening/closing interlocking part 130 while being rotated in the wing knob 105.

The opening/closing interlocking part 130 may connect the damper knob 120 and the damper 110 such that the damper 110 is opened/closed by the rotation of the damper knob 120 of which the position is changed with the wing knob 105. Specifically, the opening/closing interlocking part 130 may include a knob shaft 140 coupled to the damper knob 120 through the installation hole 103a, a damper interlocking member 150 for opening/closing the damper 110, and a connection member 160 for connecting the knob shaft 140 and the damper interlocking member 150.

According to a motion of the knob shaft 140 which is moved with the damper knob 120, the opening/closing interlocking part 130 may correct the positional change of the knob shaft 140 while the connection member 160 is moved with respect to the damper interlocking member 150.

That is, the opening/closing interlocking part 130 may stably transfer a rotational force of the knob shaft 140 to the damper interlocking member 150 while moving with respect to the damper interlocking member 150 according to a distance change between the knob shaft 140 and the damper interlocking member 150.

The knob shaft 140 may have one end coupled to the damper knob 120 through the installation hole 103a and the other end hinge-coupled to the connection member 160. At this time, the knob shaft 140 may have a link bracket 141 installed at the other end thereof, the link bracket 141 being hinge-coupled to the connection member 160.

The damper interlocking member 150 may be connected to the knob shaft 140 through the connection member 160, and open/close the damper 110 while being rotated with the knob shaft 140. For this operation, the damper interlocking member 150 may include a driven gear 151 installed in the damper 110 and a damper rotating member 153 having a driving gear 153a engaged with the driven gear 151.

The driven gear 151 may be integrated with the damper 110, and rotated about the hinge shaft of the damper 110 by the damper rotating member 153.

The damper rotating member 153 may have the driving gear 153a formed at one end thereof and a guide part 155 formed at the other end thereof, and the connection member 160 may be movably coupled to the guide part 155. The guide part 155 may include a seating groove 155a in which the connection member 160 is seated, and a guide groove 155b for guiding the connection member 160 to move in a straight line.

The connection member 160 seated in the guide part 155 of the damper rotating member 153 may be linearly moved in the seating groove 155a according to a position movement of the knob shaft 140. When the knob shaft 140 is rotated, the connection member 160 may be locked to the guide groove 155b. Then, the damper rotating member 153 may be rotated with the connection member 160.

The connection member 160 may be coupled to the knob shaft 140 and the damper interlocking member 150 such that the rotational force of the knob shaft 140 is transferred to the damper interlocking member 150. For this operation, the connection member 160 may be hinge-coupled to the knob shaft 140, and rotated and linearly moved in the damper interlocking member 150 according to a positional change of the knob shaft 140.

Specifically, the connection member 160 may include a shaft positioner 161 movably coupled to the seating groove 155a of the damper interlocking member 150, a pivot link 163 rotatably coupled to the shaft positioner 161, and a connection link 165 hinge-connecting the pivot link 163 and the knob shaft 140.

The shaft positioner 161 may be inserted and seated in the seating groove 155a, and linearly moved in the seating groove 155a. The shaft positioner 161 may include a ball joint groove 161a to which the pivot link 163 is rotatably coupled and a guide pin 161b which is movably inserted into the guide groove 155b.

The shaft positioner 161 may have an auxiliary groove 161c formed at one side of the ball joint groove 161a such that the rotation of the pivot link 163 is not restricted only in one direction and the rotational force of the pivot link 163 is transferred while the rotation thereof is restricted in the other direction. The pivot link 163 may be inserted into the auxiliary groove 161*c* and seated in the ball joint groove 161*a*.

The pivot link 163 may include a ball member 163*a* rotatably seated in the ball joint groove 161*a* and a connection bracket 163*b* hinge-connected to the connection link 165. The ball member 163*a* may have a support pin 163*c* protruding from one surface thereof, and thus rotate only in one direction in the ball joint groove 161*a*, for example, only in the upward direction of the shaft positioner 161. The support pin 163*c* may be inserted into the auxiliary groove 161*c*, and transfer a rotational force of the damper knob 120 for opening/closing the damper 110 to the shaft positioner 161.

That is, since the support pin 163*c* is inserted and supported in the auxiliary groove 161*c*, the pivot link 163 may be rotated in the diameter direction of the ball joint groove 161*a* while being locked and supported in the circumferential direction of the ball joint groove 161*a*.

One end and the other end of the connection link 165 may be hinge-connected to the link bracket 141 and the connection bracket 163*b*, respectively, and correct a positional change caused by an upward/downward or left/right movement of the knob shaft 140.

Referring to FIGS. 2 and 7 to 10, the operation of the air vent for a vehicle in accordance with the embodiment of the present invention will be described.

First, when the wing knob 105 is positioned in the center of the air vent 100 as illustrated in FIG. 2, the knob shaft 140, the connection link 165, the pivot link 163 and the shaft positioner 161 may be arranged substantially in a line with respect to the central axis line of the damper rotating member 153.

When a user rotates the wing knob 105 upward in the housing 101 as illustrated in FIG. 7, the link bracket 141 of the knob shaft 140 may be moved downward, the damper knob 120 may be moved upward, and the pivot link 163 and the connection link 165 may be rotated downward about the shaft positioner 161. In this state, the user may open/close the damper 110 by rotating the damper knob 120. At this time, since the support pin 163*c* of the ball member 163*a* is locked and supported in the auxiliary groove 161*c* and the guide pin 161*b* of the shaft positioner 161 is locked and supported in the guide groove 155*b* of the damper rotating member 153, the opening/closing rotational force of the damper knob 120 may be smoothly transferred to the damper rotating member 153.

When the user rotates the wing knob 105 downward in the housing 101 as illustrated in FIG. 8, the link bracket 141 of the knob shaft 140 may be moved upward, the damper knob 120 may be moved downward, and the pivot link 163 and the connection link 165 may be rotated upward about the shaft positioner 161. At this time, since the support pin 163*c* of the ball member 163*a* of the pivot link 163 can be moved along the auxiliary groove 161*c*, the pivot link 163 may be rotated downward in the shaft positioner 161.

In this state, the user may rotate the damper knob 120 such that the support pin 163*c* of the ball member 163*a* is locked and supported in the auxiliary groove 161*c*, and the locking of the guide pin 161*b* of the shaft positioner 161 to the guide groove 155*b* of the damper rotating member 153 may be maintained. Therefore, the opening/closing rotational force of the damper knob 120 may be smoothly transferred to the damper rotating member 153.

When the user moves the wing knob 105 to the right (refer to FIG. 9) or left (refer to FIG. 10) as illustrated in FIGS. 9 and 10, the pivot link 163 may be selectively rotated to the left or right from the shaft positioner 161, and the connection link 165 may be selectively rotated to the left or right from the pivot link 163.

The air vent 100 for a vehicle in accordance with the embodiment of the present invention, the opening/closing interlocking part 130 and the damper knob 120 for the operation of the damper 110 may be installed in the housing 101. Thus, the utilization efficiency of the outer space of the housing 101 can be improved, which makes it possible to diversify the design of the housing 101.

Furthermore, since the damper knob 120 is installed on the wing knob 105, a cover area of the housing 101, covered by the damper knob 120, can be minimized, which makes it possible to prevent a reduction in the amount of air.

Furthermore, since the opening/closing interlocking part 130 connects the damper 110 and the damper knob 120 through the pivot and multiple-link structure, the damper 110 may be easily controlled even though the position of the damper knob 120 is changed with the wing knob 105. Therefore, the damper 110 can be stably and smoothly operated by the operation of the damper knob 120.

In accordance with the embodiment of the present invention, since the opening/closing interlocking part and the damper knob for the operation of the damper are installed in the housing, the space utilization efficiency outside the housing can be improved.

Furthermore, since the damper knob is installed on the wing knob, the cover area of the housing can be minimized to prevent a reduction in amount of air.

Furthermore, since the opening/closing interlocking part connects the damper and the damper knob through the pivot link and multi-link structure, the damper can be opened/closed even though the position of the damper knob is changed with the wing knob.

Furthermore, since the opening/closing interlocking part connects the damper and the damper knob through the pivot and multi-link structure, the damper can be stably and smoothly operated by the operation of the damper knob.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An air vent system for a vehicle, comprising:
   a housing comprising a blower duct;
   a damper configured to open and close the blower duct;
   a wing member attached to the housing and configured to adjust a blowing direction of air from the blower duct;
   a damper knob coupled to the wing member, the damper knob being configured to move when the wing member moves and further configured to rotate for causing the damper to open and close the blower duct; and
   an opening-closing interlock connecting the damper and the damper knob,
   wherein the damper comprises a driven gear and a damper rotating member that is rotary about a central axis and configured to rotate the driven gear,
   wherein the opening-closing interlock comprises a knob shaft, a pivot link, a connection link and a shaft positioner that are arranged in order between the damper knob and the damper rotating member for transmitting the damper knob's rotation from the damper knob to the shaft positioner, wherein the knob shaft is fixed to the damper knob to move along with the damper knob, wherein the knob shaft is hingedly coupled to the pivot link to transmit the damper knob's rotation to the pivot link while allowing the knob shaft to pivot with respect to the pivot link about a first hinge axis, wherein the pivot link is hingedly coupled to the connection link to transmit the damper knob's rotation to the connection link while allowing the pivot link to pivot with respect to the connection link about a second hinge axis, wherein the connection link is pivotally coupled to the shaft positioner via a ball joint and engaged with the shaft positioner via protrusion-groove engagement such that the connection link is configured to transmit the damper knob's rotation to the shaft positioner while allowing the connection link to pivot with respect to the shaft positioner, wherein the shaft positioner is coupled to the damper rotating member to transmit the damper knob's rotation to the damper rotating member.

2. The air vent system of claim 1, wherein the damper knob is coupled to a wing knob for adjusting the blowing direction in the wing member, and connected to the opening-closing interlock so as to be moved with the wing knob.

3. The air vent system of claim 2, wherein the damper knob is rotatably coupled to the wing knob.

4. The air vent system of claim 1, wherein the damper rotating member further comprises a guide to which the shaft positioner is movably coupled.

5. The air vent system of claim 4, wherein the guide comprises:
   a seating groove in which the shaft positioner is seated; and
   a guide groove guiding the shaft positioner to linearly move.

6. The air vent system of claim 5, wherein the shaft positioner seated in the guide is linearly moved in the seating groove according to a position movement of the knob shaft, and the damper rotating member is rotated with the shaft positioner, as the shaft positioner is locked to the guide groove when the knob shaft is rotated.

* * * * *